US012510320B2

(12) United States Patent
Lindsey

(10) Patent No.: US 12,510,320 B2
(45) Date of Patent: Dec. 30, 2025

(54) DUAL USE MAGAZINE IDENTIFICATION WIRE WITH POWER ROUTING

(71) Applicant: BAE Systems Information and Electronic Systems Integration Inc., Nashua, NH (US)

(72) Inventor: Alexander L. Lindsey, Bastrop, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 92 days.

(21) Appl. No.: 18/591,216

(22) Filed: Feb. 29, 2024

(65) Prior Publication Data

US 2025/0277640 A1 Sep. 4, 2025

(51) Int. Cl.

| | |
|---|---|
| ***F41A 19/68*** | (2006.01) |
| ***B64D 1/04*** | (2006.01) |
| ***F41A 19/59*** | (2006.01) |

(52) U.S. Cl.

CPC ................ *F41A 19/68* (2013.01); *B64D 1/04* (2013.01); *F41A 19/59* (2013.01)

(58) Field of Classification Search

CPC . F41A 19/68; F41A 19/59; B64D 1/04; F41H 11/02

See application file for complete search history.

(56) References Cited

U.S. PATENT DOCUMENTS

| | | | | |
|---|---|---|---|---|
| 3,808,940 A * | 5/1974 | Schillreff | F41F 3/042 89/1.51 |
| 4,063,485 A | 12/1977 | Carter et al. | |
| 4,135,455 A | 1/1979 | Wallace | |
| 5,198,612 A | 3/1993 | Myers | |
| 5,351,597 A | 10/1994 | Holmstroem et al. | |
| 5,413,024 A * | 5/1995 | Plummer | F41F 3/065 89/1.816 |
| 5,461,960 A * | 10/1995 | Marks | H01R 31/06 89/1.51 |
| 5,554,815 A | 9/1996 | Authie et al. | |

(Continued)

FOREIGN PATENT DOCUMENTS

| | | |
|---|---|---|
| EP | 2916098 A1 | 9/2015 |
| GB | 2519785 A | 5/2015 |

(Continued)

OTHER PUBLICATIONS

International Search Report, PCT/US25/17014, mailed Jun. 18, 2025, 15 pages.

(Continued)

*Primary Examiner* — Joshua E Freeman

(74) *Attorney, Agent, or Firm* — Sand, Sebolt & Wernow LPA; Gary McFaline

(57) ABSTRACT

A communications interconnect between the countermeasure controller of a countermeasure system and the dispenser containing the countermeasure payloads therein. Additionally, the present disclosure provides a power connection between the countermeasure controller and the countermeasure dispenser to deliver power to the countermeasure payloads, including smart payloads, utilizing existing vehicle wiring harnesses and wiring kits.

9 Claims, 7 Drawing Sheets

(56) References Cited

U.S. PATENT DOCUMENTS

| | | | | |
|---|---|---|---|---|
| 5,773,749 | A * | 6/1998 | Cotton, III | F41A 19/65 89/1.51 |
| 5,942,713 | A | 8/1999 | Basak | |
| 6,231,002 | B1 | 5/2001 | Himba et al. | |
| 7,600,477 | B2 | 10/2009 | Zatterqvist | |
| 7,614,334 | B2 | 11/2009 | Bellino et al. | |
| 7,866,246 | B2 | 1/2011 | Bellino et al. | |
| 7,987,788 | B2 | 8/2011 | Zachrisson | |
| 8,033,225 | B2 | 10/2011 | Friede et al. | |
| 8,596,184 | B2 | 12/2013 | Lindskog | |
| 8,607,682 | B2 | 12/2013 | Zatterqvist | |
| 9,003,944 | B2 | 4/2015 | Zatterqvist | |
| 9,045,228 | B2 | 6/2015 | Melin | |
| 9,501,055 | B2 * | 11/2016 | Kolanek | F41G 7/308 |
| 9,811,079 | B2 | 11/2017 | Theiss | |
| 10,495,424 | B2 | 12/2019 | Zaetterqvist | |
| 10,683,092 | B2 | 6/2020 | Zaetterqvist | |
| 10,684,099 | B2 | 6/2020 | Zaetterqvist | |
| 10,696,401 | B2 | 6/2020 | Zaetterqvist | |
| 10,697,742 | B2 | 6/2020 | Dube et al. | |
| 10,871,348 | B2 | 12/2020 | Zatterqvist | |
| 10,940,814 | B2 * | 3/2021 | Mullins | H03K 19/20 |
| 10,948,909 | B2 | 3/2021 | Kolanek et al. | |
| 12,287,166 | B2 * | 4/2025 | Plemons | F41F 7/00 |
| 2001/0045883 | A1 | 11/2001 | Holdaway et al. | |
| 2009/0084254 | A1 * | 4/2009 | Bellino | F42B 5/15 89/1.51 |
| 2009/0193962 | A1 * | 8/2009 | Zachrisson | F42B 39/26 89/1.801 |
| 2010/0326262 | A1 | 12/2010 | Galanti et al. | |
| 2012/0210855 | A1 | 8/2012 | Clark et al. | |
| 2013/0167711 | A1 * | 7/2013 | Zatterqvist | F42B 12/70 89/1.56 |
| 2015/0331417 | A1 * | 11/2015 | Theiss | H04B 17/10 702/122 |
| 2019/0234718 | A1 * | 8/2019 | Dube | F42B 5/15 |
| 2021/0376832 | A1 | 12/2021 | Branch et al. | |
| 2021/0404783 | A1 | 12/2021 | Branch et al. | |
| 2022/0397360 | A1 * | 12/2022 | Plemons | F41A 19/70 |
| 2023/0031637 | A1 | 2/2023 | Milliorn et al. | |

FOREIGN PATENT DOCUMENTS

| | | | |
|---|---|---|---|
| WO | 2011101692 | A1 | 8/2011 |
| WO | 2022/261291 | A1 | 12/2022 |
| WO | 2023/075772 | A1 | 5/2023 |

OTHER PUBLICATIONS

International Search Report, PCT/US25/17011, mailed Apr. 8, 2025, 11 pages.

International Search Report, PCT/US25/17012, mailed Apr. 24, 2025, 13 pages.

Christopher E. Kohl et al., Enhanced Countermeasure Dispensing System With Increased Payload Capability, U.S. Appl. No. 18/045,194, filed Oct. 10, 2022.

International Search Report, PCT/US22/32790, mailed Aug. 3, 2022, 7 pages.

Mill-Max, <https://web.archive.org/web/20200924144115/https:mill-max.com/engineering-notebooks/general-application-notes>, Sep. 24, 2020.

Bae Systems Information and Electronic Systems Integration Inc., Methods for Delayed Dispersion of Chaff Within Countermeasure Expendables, PCT Application Serial No. PCT/US2156989, filed Oct. 28, 2021.

* cited by examiner

DUAL USE MAGAZINE IDENTIFICATION WIRE WITH POWER ROUTING

RELATED APPLICATIONS

Initially, it is noted that the present disclosure is related to the below listed U.S. Patent applications ("the Incorporated Applications"), filed on equal date herewith, the entirety of each of which is incorporated herein as if fully rewritten. The Incorporated Applications are:

1. U.S. patent application Ser. No. 18/591,203, entitled "DUAL USE FIRE PIN FOR POWER AND COMMUNICATION"; and
2. U.S. patent application Ser. No. 18/591,216, entitled "DUAL USE MAGAZINE IDENTIFICATION WIRE WITH POWER ROUTING".

Since the present disclosure is related to the Incorporated Applications, some similar structural nomenclature is used herein when referencing some portions of the present disclosure relative to the Incorporated Applications. However, there may be some instances where structural nomenclature differs between similar elements and there may be other instances where nomenclature is similar between distinct elements relative to the present disclosure and the Incorporated Applications. Further, there may be instances in this disclosure that utilize similar reference numerals when referencing some portions or components of the present disclosure and its associated method(s) as in the Incorporated Applications. However, there may also be instances where (i) different reference numerals are utilized herein to refer to similar components as in the Incorporated Applications and/or (ii) similar reference numerals are utilized herein to refer to different components from the Incorporated Applications.

TECHNICAL FIELD

The present disclosure relates generally to countermeasure dispensing systems. More particularly, in one example, the present disclosure relates to dual use fire pin for power and communications and dual use magazine identification wires. Specifically, in another example, the present disclosure relates to countermeasure dispensing systems allowing future smart payloads to be powered and have a data connection to the countermeasure controller while further allowing expanded capability next generation countermeasure systems to operate utilizing existing wiring systems in the vehicles carrying the countermeasure dispensing systems thereon.

BACKGROUND ART

In current military technologies, military platforms, such as a military aircraft, typically include at least one countermeasure dispensing system (CMDS). The CMDS may eject one or more countermeasure expendables from the platform to dispense chaff material or flares away from the platform to counter a detected incoming threat, such as missiles or similar ballistic threats. Such dispensing of chaff material or flares away from the platform may then redirect the incoming threat away from the platform to reduce the amount of damage to the platform or to leave the platform unscathed and/or unharmed. Each countermeasure dispenser in a standard CMDS is normally electrically connected to a countermeasure controller and/or sequencer unit for ejecting the countermeasure expendables from the dispenser; however, existing systems employ separate control interfaces and power delivery components, which can reduce the amount of power deliverable to the expendables and dispenser while further limiting the speed by which data may be transferred as well. Existing platform wiring, such as standard A-kits on most military aircraft, are well known and upgrades and/or modifications thereto are typically labor and cost prohibitive.

According to one example, a PRIOR ART CMDS (as seen in FIG. 6 herein) includes a sequencer 1 (referred to as "SQCR" in FIG. 6) that is connected with a dispenser of a dispenser assembly 2 by a set of firing lines 6. In this particular example, the dispenser of the dispenser assembly 2 houses a set of payloads 4 that are connected with the sequencer 1 for ejection and/or dispensing purposes during military operations. According to this example, payloads 6 are simply ejected and dispensed from the dispenser of the dispenser assembly 2 based on firing or electrical pulses sent from the sequencer 1 along one or more fire lines 6; no further control and/or communication between the sequencer 1, the dispenser assembly 2, and payload 4 occur during military operations.

To address some of these issues, conventional countermeasure controllers may include various technologies to provide power and data transfer to the countermeasure expendables dispensers including the use of more archaic technology that may provide minimal power and data transfer speeds. According to one example, existing systems may only achieve up to 100 mW of power delivery to the expendable payload with data transfer rates below 115.2k baud.

SUMMARY OF THE INVENTION

The present disclosure addresses these and other issues by providing a communications interconnect between the countermeasure controller of a countermeasure system and the dispenser containing the countermeasure payloads therein. Additionally, the present disclosure provides a power connection between the countermeasure controller and the countermeasure dispenser to deliver power to the countermeasure payloads, including smart payloads, utilizing existing vehicle wiring harnesses and wiring kits.

In one aspect, an exemplary embodiment of the present disclosure may provide a countermeasure dispensing system comprising: a countermeasure dispenser; a countermeasure controller; and an enhanced fire select multiplexing (EFSM) assembly; wherein the EFSM assembly is configured to provide power and data transmission to at least one expendable payload over a single fire pin pair. This exemplary embodiment or another exemplary embodiment may further provide wherein the at least one expendable payload further comprises: at least one of flares, chaff, and steerable decoys. This exemplary embodiment or another exemplary embodiment may further provide wherein the EFSM assembly further comprises: a circuit card assembly. This exemplary embodiment or another exemplary embodiment may further provide wherein the countermeasure controller further comprises: at least one sequencer; and a 28V power control module. This exemplary embodiment or another exemplary embodiment may further provide wherein the circuit card assembly further comprises: a first magazine identification line operable to connect the at least one sequencer and the 28V power control module of the countermeasure controller to a first transceiver and a first load switch bus; and a second magazine identification line operable to connect the at least one sequencer and the 28V power control module of the countermeasure controller to a second transceiver and a second load switch bus. This exemplary embodiment or another exemplary embodiment may further provide wherein the first transceiver and the first load switch bus are operable to deliver both power and data to the first countermeasure expendable payload. This exemplary embodiment or another exemplary embodiment may further provide wherein the second transceiver and the second load switch bus are operable to deliver both power and data to the second countermeasure expendable payload. This exemplary embodiment or another exemplary embodiment may further provide wherein the first and second transceivers and first and second load switch buses are operable to deliver 20 W of power to the first and second countermeasure expendable payloads. This exemplary embodiment or another exemplary embodiment may further provide wherein the first and second transceivers and the first and second load switch buses are operable to deliver data at a 500k baud rate to the first and second countermeasure expendable payloads. This exemplary embodiment or another exemplary embodiment may further provide a first magazine identification line and first transceiver operable to connect the countermeasure controller to deliver power and data to a first countermeasure expendable payload; and a second magazine identification line and second transceiver operable to connect the countermeasure controller to deliver power and data to a second countermeasure expendable payload. This exemplary embodiment or another exemplary embodiment may further provide a vehicle carrying the countermeasure dispensing system thereon. This exemplary embodiment or another exemplary embodiment may further provide wherein the vehicle further comprises: an aircraft having an A-kit wiring harness therein. This exemplary embodiment or another exemplary embodiment may further provide a wiring harness operable to connect the countermeasure controller to the A-kit wiring harness of the aircraft.

In another aspect, an exemplary embodiment of the present disclosure may provide a method of delivering power and data to a countermeasure expendable payload comprising: detecting a threat against a vehicle carrying a countermeasure dispensing system thereon; determining a countermeasure response including the deployment of at least one countermeasure expendable from a countermeasure expendable payload; generating a power signal to the at least one expendable; generating a data signal including a mission data file to the at least one countermeasure expendable; multiplexing the power and data signals onto a single fire line path connected to a fire pin pair of the at least one countermeasure expendable; and deploying the at least one countermeasure expendable from the countermeasure expendable payload. This exemplary embodiment or another exemplary embodiment may further provide wherein the at least one countermeasure expendable further comprises: at least one of flares, chaff, and decoys. This exemplary embodiment or another exemplary embodiment may further provide wherein the at least one countermeasure expendable is a decoy, the decoy further comprising: a steerable decoy operable to direct the threat away from the vehicle. This exemplary embodiment or another exemplary embodiment may further provide wherein determining the countermeasure response further comprises: determining characteristics of the threat including at least one of the type, current position, heading, and velocity of the detected threat; and generating a custom countermeasure response based on the determined characteristics of the threat. This exemplary embodiment or another exemplary embodiment may further provide wherein the mission data file further comprises: the determined characteristics of the threat; and the custom countermeasure response. This exemplary embodiment or another exemplary embodiment may further provide wherein generating the power signal further comprises: generating a 20 W power signal. This exemplary embodiment or another exemplary embodiment may further provide wherein multiplexing the power signal and the data signal onto the single fire line path further comprises: transmitting the 20 W power signal; and simultaneously transmitting the data signal at a 500k baud rate.

In yet another aspect, an exemplary embodiment of the present disclosure may provide an enhanced fire select multiplexing (EFSM) assembly for a countermeasure dispenser system comprising: at least one sequencer; a 28V power control module; a first magazine identification line operable to connect the at least one sequencer and the 28V power control module to a first transceiver and a first load switch bus; a second magazine identification line operable to connect the at least one sequencer and the 28V power control module to a second transceiver and a second load switch bus; a first countermeasure expendable payload connected to the first transceiver and the first bus load switch; and a second countermeasure expendable payload connected to the second transceiver and the second load switch bus; wherein the EFSM assembly is configured to provide power and data transmission to at least one countermeasure expendable payload from one of the first and second countermeasure expendable payloads over a single fire pin pair. This exemplary embodiment or another exemplary embodiment may further provide a circuit card assembly having the first magazine identification line and the second magazine identification line thereon; and a countermeasure controller containing the at least on sequencer and the 28V power control module therein. This exemplary embodiment or another exemplary embodiment may further provide wherein the first transceiver and the first load switch bus are operable to deliver both power and data to the first countermeasure expendable payload. This exemplary embodiment or another exemplary embodiment may further provide wherein the second transceiver and the second load switch bus are operable to deliver both power and data to the second countermeasure expendable payload. This exemplary embodiment or another exemplary embodiment may further provide wherein the first and second transceivers and first and second load switch buses are operable to deliver 20 W of power to the first and second countermeasure expendable payloads. This exemplary embodiment or another exemplary embodiment may further provide wherein the first and second transceivers and first and second load switch buses are operable to deliver data at a 500k baud rate to the first and second countermeasure expendable payloads. This exemplary embodiment or another exemplary embodiment may further provide wherein the countermeasure dispensing system further comprises: a vehicle carrying a countermeasure dispenser containing the at least one expendable payload therein. This exemplary embodiment or another exemplary embodiment may further provide wherein the at least one expendable payload further comprises: at least one of flares, chaff, and steerable decoys. This exemplary embodiment or another exemplary embodiment may further provide wherein the vehicle further comprises: an aircraft having an A-kit wiring harness therein. This exemplary embodiment or another exemplary embodiment may further provide a wiring harness operable to connect the at least one sequencer and the 28V power control module to the A-kit wiring harness of the aircraft.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
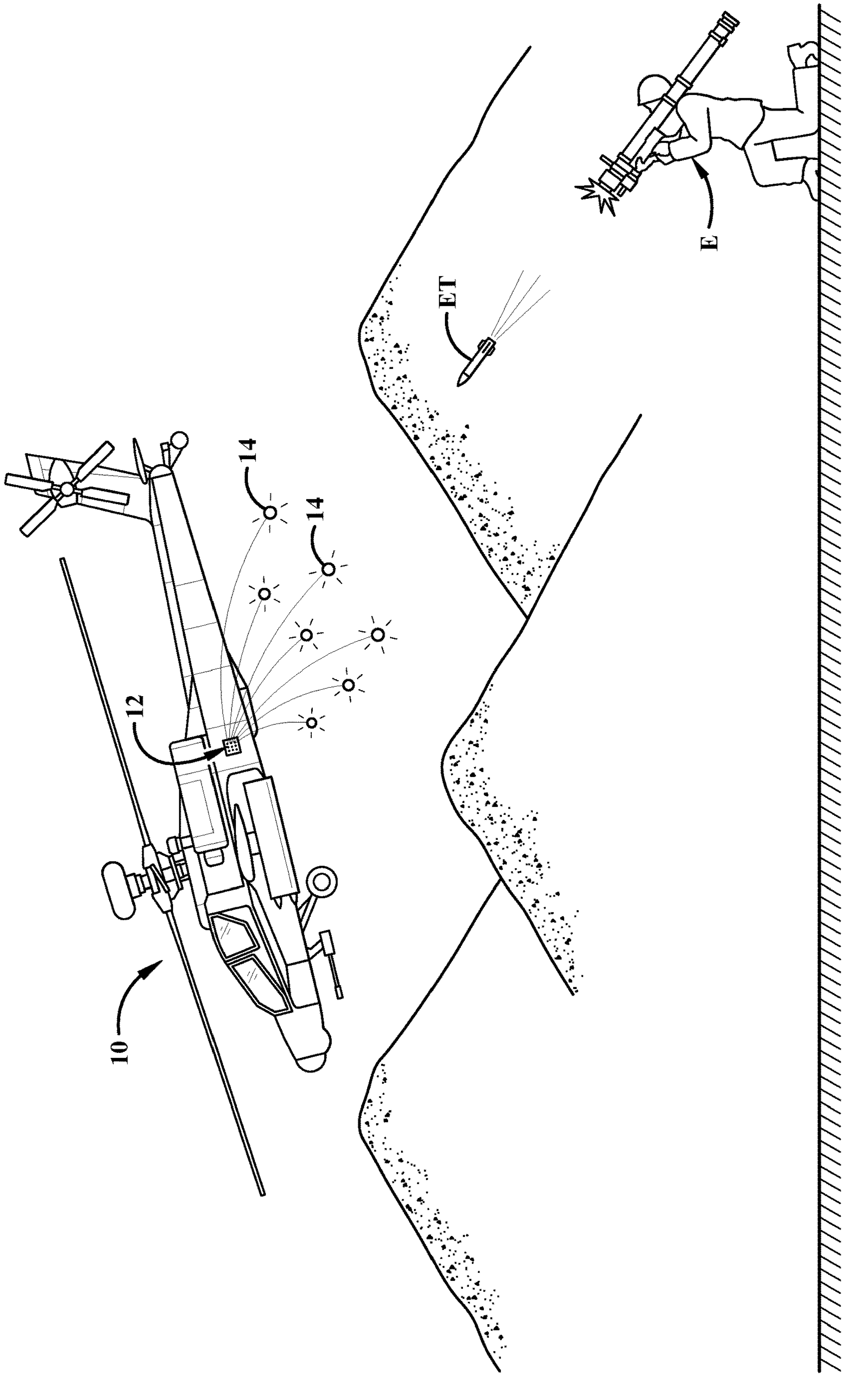
FIG. 1 is a diagrammatic view showing a platform having a countermeasure dispensing system (CMDS) wherein the CMDS is being used to deter an incoming enemy threat via countermeasure material.

FIG. 1 illustrates a platform 10 which may be or include any ground vehicle, sea-based vehicle, aircraft, including manned and unmanned, and the like carrying a countermeasure dispensing system (CMDS) 12 thereon or therewith. According to one aspect, platform 10 may further be or include any remotely operated vehicles, drones, unmanned aerial vehicles (UAVs), and/or satellites. As used herein, platform 10 is illustrated as a manned aircraft (shown in FIG. 1 as a helicopter); however, the examples and description provided herein will be understood to be equally applicable across all versions of platform 10 as dictated by the desired implementation, unless specifically stated otherwise.

CMDS 12 may operably engage at least a portion of platform 10 and may be in operable communication therewith. According to one aspect, the CMDS 12 may be electrically connected to a legacy wiring harness A-kit (not illustrated) that is provided in the platform 10 to provide power and communication to some or all electrical components in the CMDS 12, which is described in more detail below.

Prior to the initiation of a military operation or of a mission of the platform 10, the CMDS 12 may be loaded with a set of countermeasure expendables 14 which may be or include one or more of flares, chaff material, programmable decoys, or the like, for countermeasure purposes. In addition, each countermeasure expendable 14 of the set of countermeasure expendables 14 includes an impulse cartridge, such as a squib, for detonating and dispensing the countermeasure material 14 from the platform 10. During military operation, the countermeasure material 14 (e.g., flare and/or chaff material) provides a distraction to an incoming enemy threat (shown as "ET" in FIG. 1), initiated by an enemy "E", where the incoming enemy threat is diverted to the flare and/or chaff material countermeasure expendable 14 while allowing the platform 10 to remain relatively unscathed. During the military operation or the aerial mission, the platform 10 may receive a warning from an on-board electronic warfare (EW) system regarding the incoming enemy threat approaching the platform 10. Upon a determination made by the on-board EW system and/or an operator, the CMDS 12 may dispense a calculated amount of countermeasure expendables 14 from the set of countermeasure expendables 14 that are disposed with and carried by the platform 10.

As discussed further herein, it will be understood that the CMDS 12 is logically powered and controlled by at least one countermeasure controller (CMC) which may be or form a part of an on-board countermeasure system. This system may include suitable devices and apparatuses that are operably engaged with one another to logically control and power the CMDSs (such as CMDS 12) described and illustrated herein. In the illustrated embodiments, CMDSs described and illustrated herein may be logically powered and controlled by a legacy on-board components and/or systems retaining a majority of legacy devices and apparatuses that are operably engaged with and in communication with one another, unless explicitly stated otherwise. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness A-kit operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such components of CMDS 12 are described in further details below.

Figure 2:
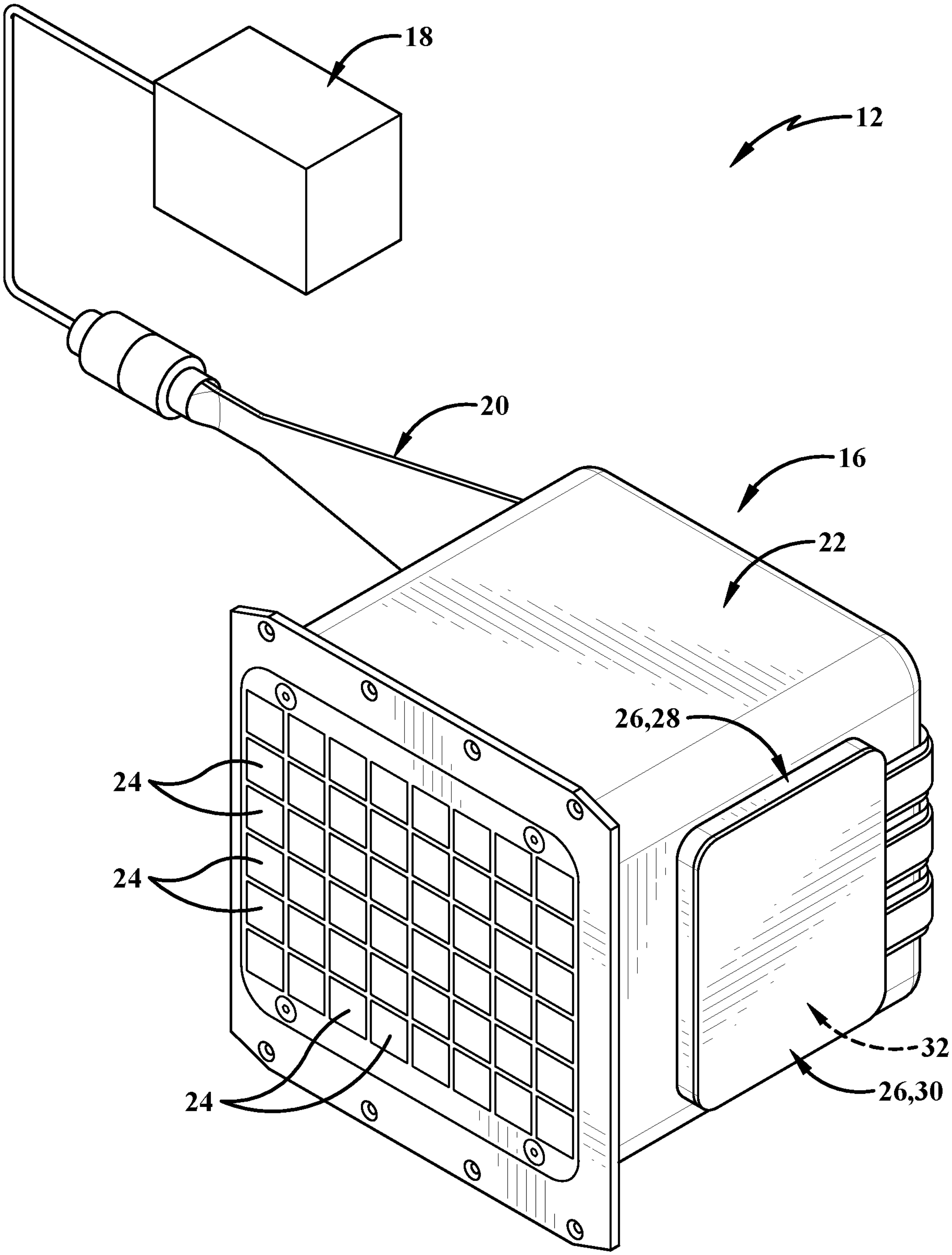
FIG. 2 is a top front isometric perspective view of an exemplary CMDS according to one aspect of the present disclosure.
Figure 3:
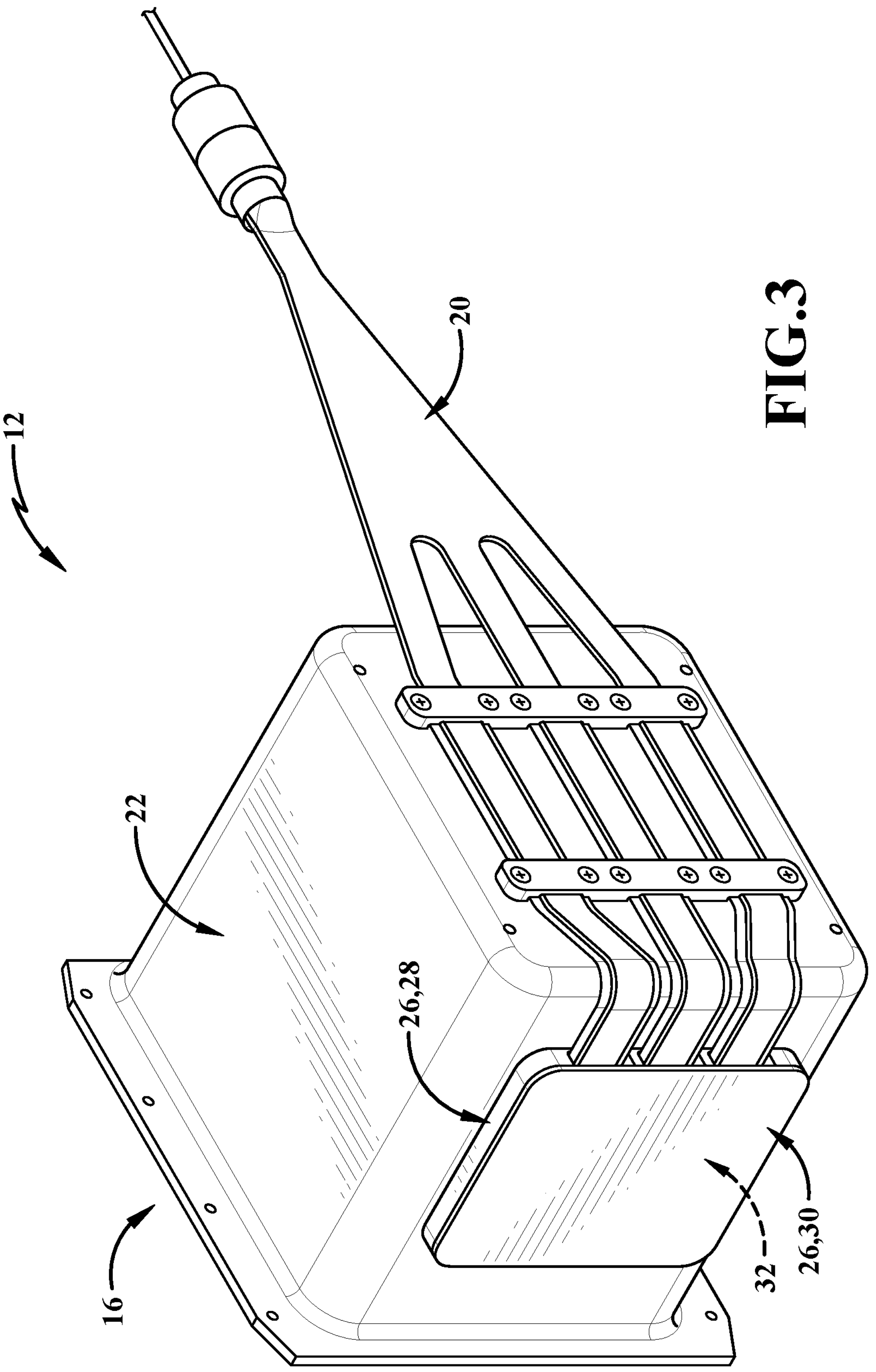
FIG. 3 is a top rear isometric perspective view of the CMDS of FIG. 2 according to one aspect of the present disclosure.
Figure 4:
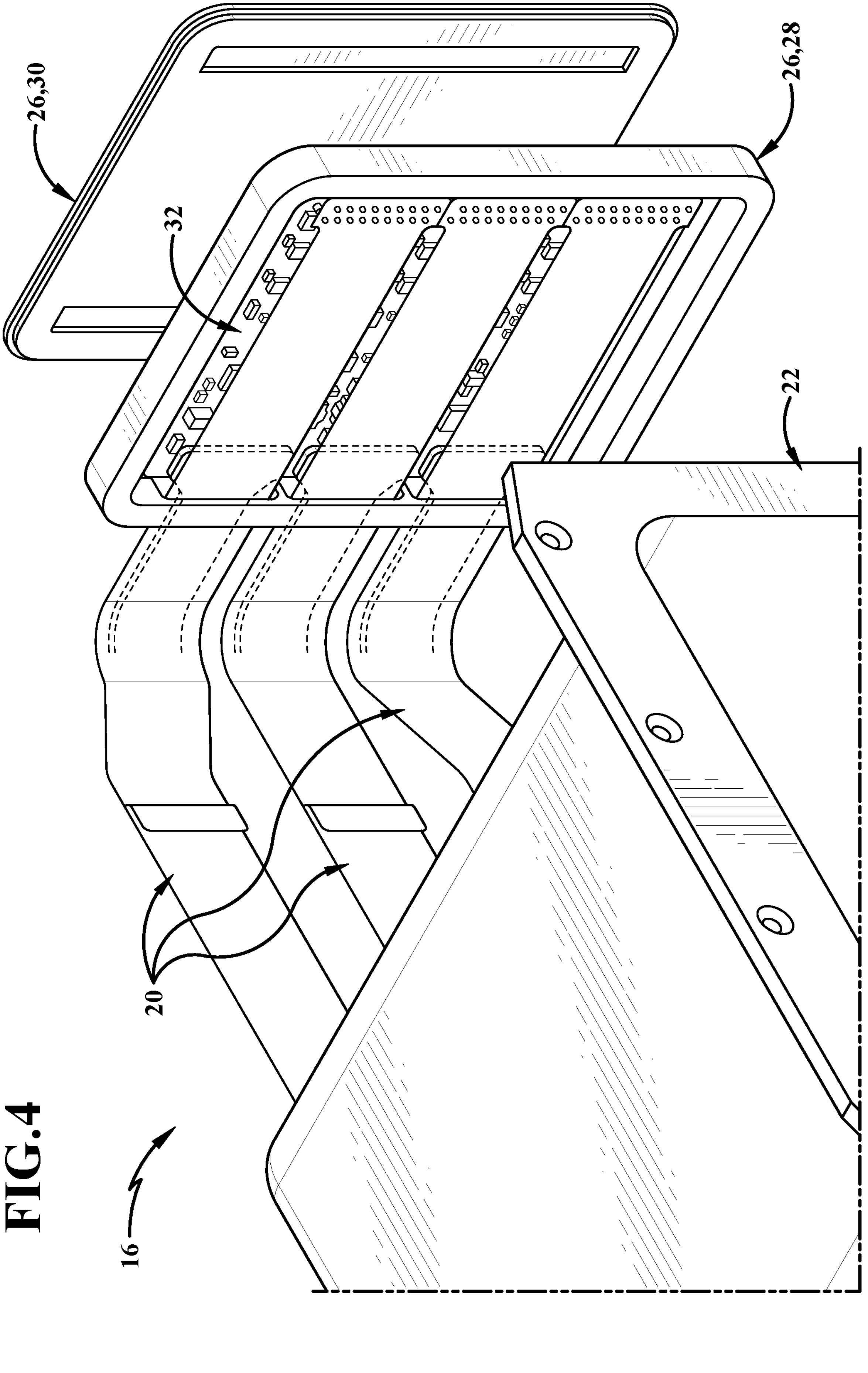
FIG. 4 is a close up exploded isometric perspective view of the CMDS electronic control module according to one aspect of the present disclosure.

With reference to FIGS. 2-4, CMDS 12 may include a dispenser assembly 16 that operably engages with the platform 10. Dispenser assembly 16 may further include a countermeasure controller (CMC) 18, a wiring harness 20, a dispenser bucket 22, referred to simply as dispenser 22, a plurality of expendable canisters 24, which may include countermeasure expendables 14 contained therein, and an enhanced fire select multiplexing (EFSM) assembly 26. Dispenser assembly 16 may be configured to hold various other assemblies, components, and parts of a CMDS 12 inside of the platform 10 for countermeasure operations, as described herein. Many of these components are not illustrated or described in detail herein; however, it will be understood that all necessary and usual components of an operable CMDS, such as CMDS 12, are included in the scope of the disclosure herein. Likewise, any necessary and usual connectors or fasteners may operably engage the dispenser assembly 16 and its components together and/or with the platform 10 through suitable and conventional means currently used in the art.

In one exemplary embodiment, dispenser assembly 16 may be a legacy AN/ALE-47 dispenser used in a standard AN/ALE-47 CMDS. In another exemplary embodiment, dispenser assembly 16 may be a new dispenser assembly that is configured to be used with a new CMDS currently available on platforms discussed herein.

CMC 18 may be any suitable standard countermeasure controller and may be integrated into other systems onboard the vehicle 10, including systems operable to detect and track incoming threats, location systems operable to detect and identify threats and enemies, pilot and operator interface systems, and the like. CMC 18 may include any suitable processors or processing components, logic controllers, or the like and may include legacy CMCs. As discussed below, CMC 18 may be operable to initiate the delivery of power and to transmit data signals to the EFSM assembly 26. CMC 18 may be automatically controlled through its connection and operable communication with other systems, or may be manually controlled by a pilot or operator of vehicle 10, as desired. According to one non-limiting example, CMC 18 may be automatically controlled by a threat detection system onboard an aircraft to deploy one or more expendables 14 in response to the detection of an incoming threat. Alternatively, in a similar scenario, the threat detection system may alert the pilot of the aircraft, who may then decide to direct the CMC 18 to deploy one or more expendables 14 in response to the threat.

Figure 7:
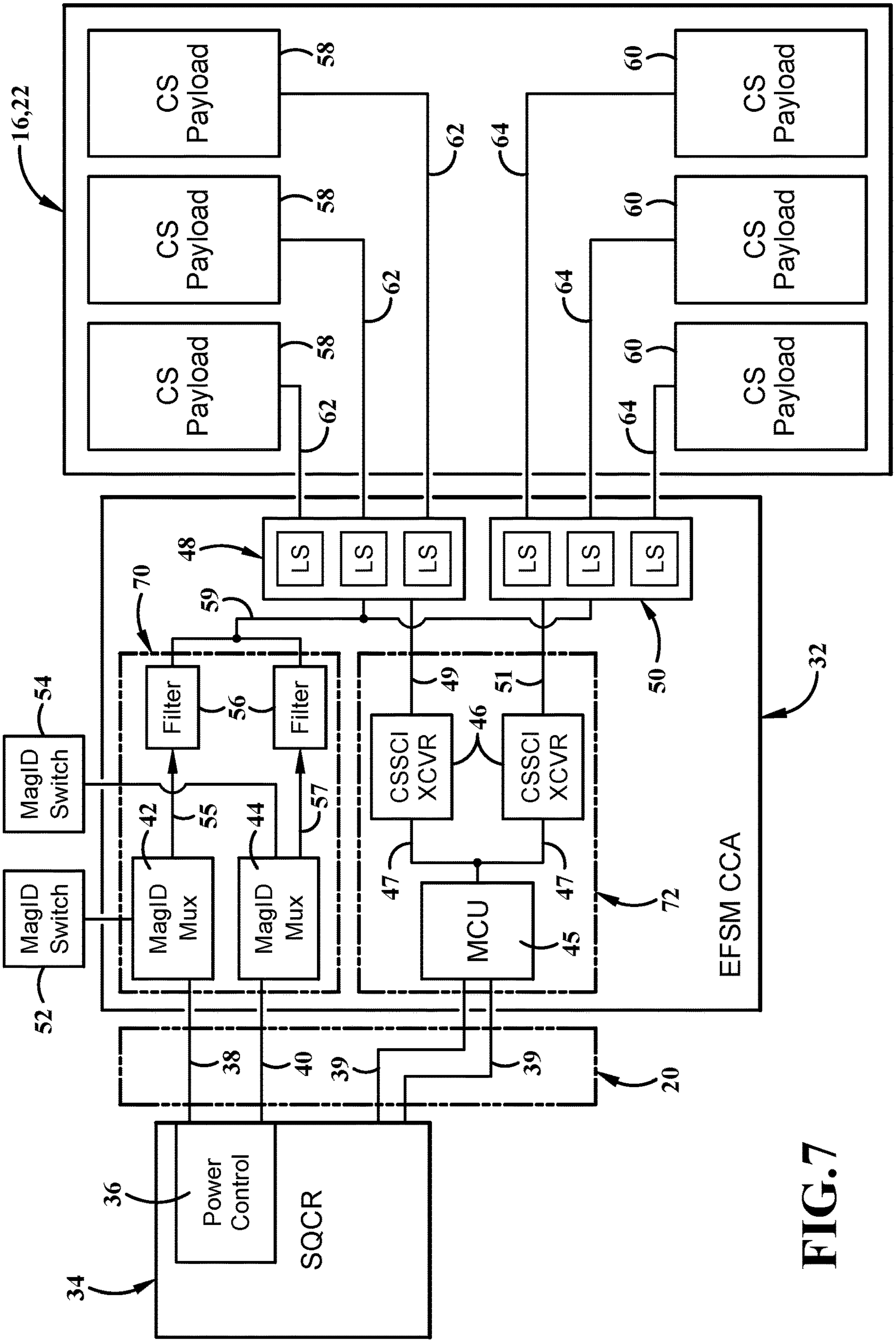
FIG. 7 is a block diagrammatic view of an exemplary CMDS electronic control module according to one aspect of the present disclosure.

CMC 18 may further be or include a sequencer, such as sequencer 34, and a power source, such as power control module (PCM) 36 (sequencer 34 and PCM 36 are best seen in FIG. 7). In one particular embodiment, PCM 36 is configured to deliver 28V of power to the CCA 32 with approximately 40 W. CMC 18 may be in direct connection with dispenser 22. Specifically, CMC 18 may be in direct connection with EFSM assembly 26 of dispenser 22, as discussed further below.

Dispenser assembly 16 may also include wiring harness 20 which may be configured to provide an electrical connection between the dispenser 22 and the CMC 18 provided on the platform 10 to enable power and data communication between the dispenser 22 and the CMC 18 for dispensing and/or ejecting expendables 14 from the CMDS 12, as described further below.

Wiring harness 20 may provide electrical and data connections between the vehicle's 10 existing wiring system, such as a legacy A-kit or the like in an aircraft, and the CMDS 12. Included in the wiring harness may be magazine identification lines to connect the CMC 18 to the EFSM assembly 26, as discussed herein. Specifically, wiring harness 20 may include a first magazine identification line (hereinafter "first ID line") 38 and a second magazine identification line (hereinafter "second ID line") 40 connecting the PCM 36 and sequencer 34 to a first magazine identification multiplexer 42 (hereinafter "first ID mux" or "first multiplexer") and a second magazine identification multiplexer 44 (hereinafter "second ID mux" or "second multiplexer") of the EFSM circuit card assembly (CCA) 32. The first and second ID lines 38, 40, first and second multiplexers 42, 44 (FIG. 7), and EFSM CCA 32 (FIGS. 5 and 6) are discussed in more detail below.

Still referring to wiring harness 20, the wiring harness 20 may also include a bridge electronics feed or digital data link (hereinafter "DDL") 39. As best seen in FIG. 7, the DDL 39 is configured to deliver power and data signals between the CCA 32 and the sequencer 34 for military purposes. In one instance, the DDL 39 may deliver power from the sequencer 34 to the CCA 32 for powering control circuitry and components provided on CCA 32; such control circuity is discussed in greater detail below. In this same instance, the DDL 39 may also data signals from the sequencer 34 to the CCA 32 for ejecting and dispensing one or more payloads that are loaded in the dispenser 22 of the dispenser assembly 16. In another instance, DDL 39 may deliver data signals from the sequencer 34 to the CCA 32 for updating programs and/or parameters to one or more payloads loaded in the dispenser 22 of the dispensing assembly 16, including flight programs based on the mission and/or events that may occur prior to flight. In yet another instance, DDL 39 may deliver data signals from the CCA 32 to the sequencer 34 based on events that occurred downstream of the CCA 32, including updates regarding ejection of one or more payloads, squib misfires and/or malfunctions, and other relevant updates or data that would provide assistance to the sequencer 32 when selecting a desired payload. It should also be noted that DDL 39 includes two lines (see FIG. 7) that are the two remaining ID lines (i.e., third and fourth ID lines) that are split from the first and second ID lines 38, 40. As described and illustrated herein, DDL 39 is a separate component from the first and second ID lines 38, 40 that provides power to control circuitry of the CCA as well as delivers data to control circuitry that is discussed in greater detail below.

Dispenser bucket 22, at its most basic, may be a housing for a plurality of expendable canisters 24 which may hold and ultimately deploy the countermeasure expendables 14 as described herein. It should be understood that dispenser 22 may include any necessary and usual components, including mounting surfaces, hardware, and the like. As mentioned above, dispenser 22 may be a legacy dispenser that may be modified to accommodate the EFSM assembly 26 (discussed below) or may alternatively be a new dispenser configured to replace previous dispensers in other CMDSs. It is contemplated that dispenser 22 (and dispenser assembly 16 by extension) may be configured to "plug and play" in existing CMDSs utilizing existing wiring A-kit harnesses and other existing wiring from the vehicle 10 in which the dispenser assembly 16 and dispenser 22 are installed. By only replacing and/or modifying the dispenser 22 as described herein may allow retrofitting of older legacy systems with minimal modification and minimal cost. Further, the use of such legacy assets may allow interchangeability between existing CMDSs and the present CMDS 12 which may further reduce costs and maintenance requirements.

CMDS 12 also includes an EFSM assembly 26 operable as the interface between the CMC 18 and the dispenser assembly 16, as discussed in more detail below. EFSM assembly 26 may include a housing 28 and cover 30, which may further encase the EFSM CCA 32 mentioned above. The EFSM CCA 32 (referred to further herein as simply CCA 32) may be a printed circuit board and/or printed circuit assembly encompassing both power and data multiplexing circuits, as discussed below. The inclusion of the CCA 32 and its components may allow for the dual use fire pins for both power and communications, as well as the dual use magazine identification wires for power delivery to the CMDS 12 expendable 14 payloads. It is the presence and operation of these dual use fire pins and dual use magazine identification wires that provide the benefit of increased power delivery up to 20 W and increased data transmission rates up to 500k baud, as discussed further below.

Dispenser assembly 16 may further include a breechplate assembly (not shown) that operably engages with the dispenser 22 and may be housed inside of the dispenser 22. Breechplate assembly may include and provide any suitable number of firing lines as needed to connect the EFSM assembly 26, or more particularly the CCA 32, to a set of firing pins in operable connection with the expendable canisters 24. The set of firing pin mechanisms (not shown) may be any suitable firing pin mechanisms that are capable of initiating impulse cartridges (such as squibs) to dispense countermeasure material from countermeasure expendables known in the art. In one exemplary embodiment, a set of firing pin mechanisms that may be used include firing pin mechanisms described and illustrated in U.S. patent application Ser. No. 17/345,551. In another exemplary embodiment, a set of firing pin mechanisms that may be used include firing pin mechanisms described and illustrated in U.S. patent application Ser. No. 18/045,194. While not illustrated herein, the breechplate assembly will be understood to further house any suitable electrical connections and/or electrical wiring that operably engages with each firing pin mechanism of the set of firing pin mechanisms to the CCA 32.

Figure 5:
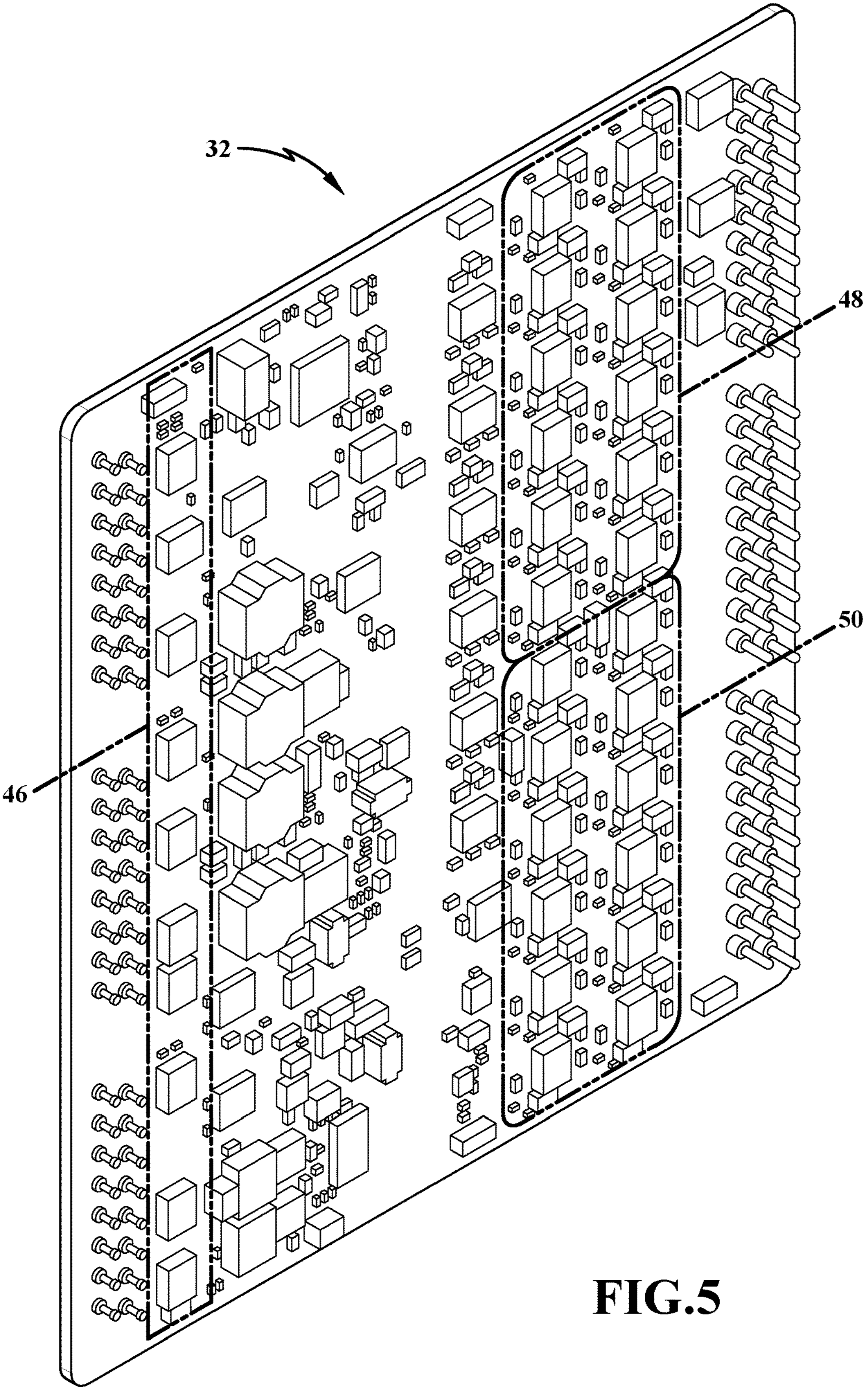
FIG. 5 is a front isometric perspective view of an exemplary printed circuit board CMDS electronic control module according to one aspect of the present disclosure.
Figure 6:
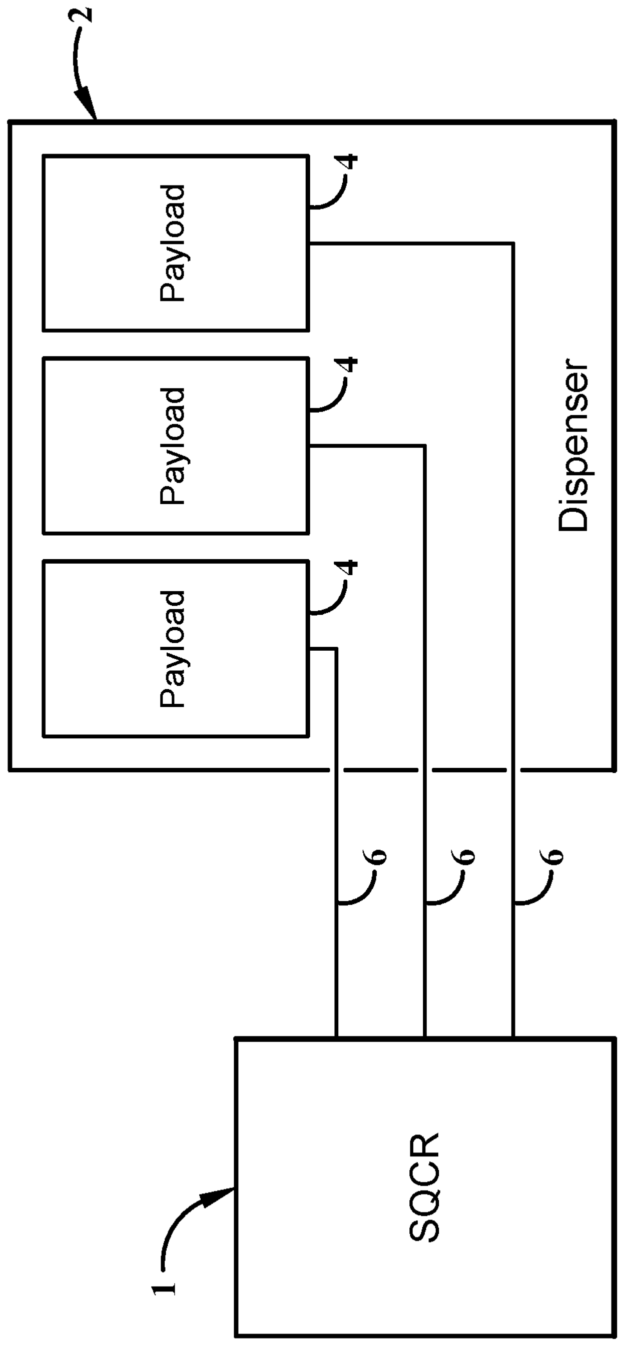
FIG.6 PRIOR ART
FIG. 6 is a block diagrammatic view of a PRIOR ART CMDS.

With reference to FIGS. 5 and 6, an exemplary CCA 32 is shown and will be described in more detail. In particular, FIG. 5 shows an exemplary CCA 32 with various components and an exemplary configuration thereof while FIG. 7 is a block diagram illustrating the main aspects of the CCA 32. Unless specifically called out or stated otherwise, the components of CCA 32 may be standard components. For example, as a printed card assembly, CCA 32 may include standard connectors, including power connectors, grounds and the like, along with other standard components such as capacitors, transistors, voltage gates, etc. Such components may be standard in that they may be unmodified from their normal construction and may be used according to their normal operation.

As mentioned previously, the CCA 32 is connected and/or interfaced with the PCM 36 of the sequencer 34 by the first and second ID lines 38, 40 provided with the wiring harness 20 (see FIG. 6). More particularly, the first and second multiplexers 42, 44 are electrically connected with the PCM 36 of the sequencer 34 by the first and second ID lines 38, 40. The first and second multiplexers 42, 44 are also connected with a filter 56, by first and second power lines 55, 57, in which the filter 56 acts as a conventional input power filter (see FIG. 7). In one exemplary embodiment, the filter 56 may be configured to at least suppress unwanted noise and surges from upstream devices as well as to decrease and/or prevent electromagnetic interference. In this particular embodiment, the filter 56 is split into two diagrammatic boxes to illustrate that the first and second multiplexers 42, 44 are connected with the single filter 56. If desired in other exemplary embodiments, a filter may be connected with first and second multiplexers 42, 44 based on the circuitry and/or electrical configuration of CCA 32. The filter 56 may also be connected with first and second load switch buses (discussed in greater detail below), by a power bus 59, to provide power to the first and second load switch buses when PCM 36 is powered to an activated or ON state.

It should be noted that certain components and devices of CCA 32 mentioned above may be grouped and/or categorized into a first or power interface 70 (denoted by a dashed box labeled 70 in FIG. 7). As best seen in FIG. 7, the first interface 70 may include the first and second ID lines 38, 40, first and second multiplexers 42, 44, filter 56, first and second power lines 55, 57, and power bus 59. As discussed in greater detail below, such activation of the first interface 70, by the power delivered from the PCM 36, will cut or deactivate power to a magazine identification switches of the CCA 32 and reroute such power to a power and communications interface of the CCA 32. In operation, and as discussed in greater detail below, the first interface 70 provides power to downstream components provided in CCA 32, including first and second load switch buses 48, 50, and downstream components provided in the dispenser assembly 16, including payloads 58, 60. With such power, one or more payloads of a first group of payloads 58 that is loaded in the dispenser assembly 16 may be pre-powered and/or initiated before such selected payload is launched. Similarly, with such power, one or more payloads of a second group of payloads 60 that is loaded in the dispenser assembly 16 may be pre-powered and/or initiated before such selected payload is launched.

The CCA 32 may include a second interface 72 that has both a power and communication interface allowing the CMC 18 to control and communicate with a payload over the same fire pin pairs. This second interface 72 may be a countermeasure smart stores communication interface, known as CSSCI, which may further allow both a high power and fast baud rate between the countermeasure controller and payload allowing power ratings of up to 20 watts with a 500k baud rate. Prior systems utilizing dedicated power and communications systems could only achieve approximately 100 milliwatts of power with a maximum of 115.2k baud rate on data communications between the countermeasure controller and the payload of the dispenser.

The second interface 72 may include a microcontroller unit (MCU) 45 that is connected with the sequencer 34 by the DDL 39 (see FIG. 7). In the present disclosure, MCU 45 is configured to output and/or route data signals from the sequencer 34 to downstream devices provided in the second interface for ejecting and dispensing certain payloads provided in the dispenser 22. As such, MCU 45 acts in accordance with the data signals outputted from the sequencer 34. It should be noted that MCU 45 may also output data signals to the sequencer 34 during operation of CMDS 10, including updates regarding ejection of one or more payloads, squib misfires and/or malfunctions, and other relevant updates or data that would provide assistance to the sequencer 32 when selecting a desired payload.

The power and communications interface (CSSCI) of the second interface 72 that may be modulated through a use of a CSSCI transceiver 46, with a dedicated CSSCI transceiver 46 for each of a first load switch bus 48 and a second load switch bus 50. As best seen in FIG. 7, MCU 45 is connected with CSSCI transceivers 46 by a bus 47 to deliver both power and data signals to one or both of the CSSCI transceivers 46. In one instance, the bus 47 that connects the MCU 45 and the CSSCI transceivers 46 with one another may be a universal asynchronous receiver-transmitter bus or device for outputting power and data signals from the MCU 45 to the CSSCI transceivers 46. With respect to the first and second load switch buses 48, 50, these first and second load switch buses 48, 50, may be separated based on having multiple payloads 58 and 60. These separations may be based on any suitable factor, including the physical location of the payloads 58 and 60 (such as on separate sides of a platform 100).

Still referring to FIG. 7, the CSSCI transceivers 46 are also connected to first load switch bus 48 and the second load switch bus 50 by a pair of keyed data paths 49, 51. In one routing, a first CSSCI transceiver 46 is connected with the first load switch bus 48 by a first keyed data path 49. It should be understood that the first keyed data path 49 is a single ON/OFF modulated data path that allows for individual communication to a specific load switch provided in the first load switch bus 48 and a specific payload that is connected with said load switch. Such selection or modulation of the first keyed data path 49 is performed by the MCU 45 based on data outputted from the sequencer 34 along the DDL 39. Similarly, in another routing, a second CSSCI transceiver 46 is connected with the second load switch bus 51 by a second keyed data path 50. Similar to the first keyed data path 49, the second keyed data path 51 is also a single ON/OFF modulated data path that allows for individual communication to a specific load switch provided in the second load switch bus 50 and a specific payload that is connected with said load switch. Such selection or modulation of the keyed data path 49 is performed by the MCU 45 based on data outputted from the sequencer 34 along the DDL 39.

It should be noted that the first keyed data path 49 and the second keyed data path 51 may include any suitable communication protocol and any suitable electrical configuration to deliver power and data signals from the CSSCI transceivers 46 to the first and second load switch buses 48, 50. In one exemplary embodiment, the first keyed data path 49 and the second keyed data path 51 are each a single path, ON-OFF-keyed RS-485 communication interface that is alternating current (AC) coupled onto existing fire lines. In this particular embodiment, the first keyed data path 49 provides a single path, ON-OFF-keyed RS-485 communication interface that is alternating current (AC) coupled onto existing fire lines 62 that are electrically connected to a first group or set of payloads 58 loaded in a magazine of the dispenser assembly 16; such configuration may allow for power and data signals to be coupled together so that such signals are sent downstream to the respective load switch bus 48, 50 and a selected payload from the groups of payloads 58, 60. Similarly, the second keyed data path 50 also provides a single path, ON-OFF-keyed RS-485 communication interface that is alternating current (AC) coupled onto existing fire lines 64 that are electrically connected to a second group or set of payloads 60 loaded in a magazine of the dispenser assembly 16; such configuration may allow for power and data signals to be coupled together so that such signals are sent downstream to the respective load switch bus 48, 50 and a selected payload from the groups of payloads 58, 60.

As discussed and illustrated herein, CCA 32 includes two dedicated CSSCI transceivers 46 that are connected with the first and second load switch buses 48, 50. In the present disclosure, however, the two CSSCI transceivers 46 are merely a single CSCCI transceiver 46 that is split and/or partitioned into two transceivers. Such splitting and/or partitioning of the single CSSCI transceiver 46 separates the first load switch bus 48 and the second load switch bus 50 from one another so that the MCU 45 may individually control and command when one or more payloads connected with the first load switch bus 48 may be initiated and when one or more payloads connected with the second load switch bus 50 may be initiated. If desired, however, individual and separate CSSCI transceivers 46 may be implemented into the second interface 72 if structurally and/or electrically possible for CCA 32.

The CSSCI transceiver 46 power and communications interface allows the use of a multiplexing and modulation scheme to prevent degradation of a data signal while simultaneously keeping the power component below a sure fire level of a squib utilized to launch one or more countermeasure expendables 14 from the dispenser 22 and canisters 24. In doing so, the modulation of data may utilize a sine wave band pass signal in order to prevent data signal degradation while the power component may maintain the modulation utilizing square wave modulation with a low band pass signal.

Accordingly, the utilization of the same path for both power and data may allow the countermeasure controller to pre-power or prime the expendable countermeasure system payloads (e.g. the expendables 14) while within the magazine of the dispenser 22 which may allow the expendable 14 to utilize a lower complexity initiator such as a squib while simultaneously allowing any smart payload components to have mission data files updated on the fly and in real time to adapt to specific threat environments. It should be understood that the power is provided from the first interface to power the first and second load switch buses 48, 50 as well as the first and second groups of payloads 58, 60. This may enable the use of the present systems in current countermeasure scenarios while further enabling future electronic warfare system parameters to be fed to countermeasure payloads in real time. Providing a highly adaptable countermeasure that may be more effective in wider and more technologically advanced situations.

As discussed above, the EFSM assembly 26 may utilize first and second ID lines 38 and 40 that are dual function having a dedicated multiplexer (i.e. first and second multiplexers 42 and 44) or switching circuit to allow normal use of first and second ID lines 38 and 40 until or unless the 28-volt power control source 36 is activated, which may redirect power from the first and second ID lines 38, 40 and provide a 28-volt feed to the CSSCI transceivers 46.

Such integration of EFSM CCA 32 that includes first interface 70 and second interface 72 between the sequencer 34 and the dispenser assembly 16 is considered advantageous at least because this multiplexing switch circuit further allows the CSSCI to be split into two groups of countermeasure system payloads which may be turned on or off utilizing high side load switches. This may provide additional safety measures as the payload will not respond when in an unpowered state and a signal common to the bus filters is snubbed via a shunt resistance that may be enabled with a field-effect transistor (FET) or similar device. By housing both data and power on the same board of the ECM the CMDS 12 and countermeasure controller along with dispenser and sequencers may be installed in existing vehicles replacing the old dispensers and sequencers while maintaining a capability with the existing power delivery component A-kits of the vehicle. These A-kits, also referred to as wiring systems of the vehicle may be extremely expensive and difficult to change as these wiring kits tend to extend throughout all vehicle parts and systems. Thus, the ability to adapt the present CMDS 12 for use with existing vehicles may further allow future evolution of counter measure systems in existing vehicle deployments to adapt to utilize smart countermeasure technology and to further protect the vehicle in every evolving electronic warfare and physical threat environments.

Having thus described the elements and components of CMDS 12, an exemplary use thereof will now be discussed.

Described herein is an exemplary method of firing at least one countermeasure expendable from the CMDS 12 utilizing the CSSCI transceiver 46 interface between the CMC 18 and the countermeasure expendables 14 payload. As with other countermeasure systems the firing of one or more countermeasure expendables 14 may be prompted by an external threat such as the incoming enemy threat described previously herein. As discussed herein, the countermeasure expendable 14 may be a smart expendable, or any other suitable standard expendable such as chaff, flares, programmable decoys, or the like. Smart expendables may include any current or future smart technology expendables such as programmable decoys, self-maneuvering expendables, or the like.

It will therefore be understood that the process described herein may be exemplary and may be modified or adapted for use with any suitable expendable type including future, not yet available, smart expendables operable to be dispensed from a CMDS such as CMDS 12 described herein.

As mentioned above, the process may begin with the detection or identification of an enemy threat being launched against a vehicle or platform. This detection process may be performed automatically or may prompt a manual response as dictated by the desired implementation. Similarly, the process of deploying one or more countermeasure expendables 14 may be controlled automatically in response to the detection of an enemy threat or may be manually prompted by a pilot or other operator of a vehicle or platform against which the enemy threat is directed.

Accordingly, upon the detection of an enemy threat the determination that a countermeasure expendable 14 is needed may be made, again either automatically or manually, and the CMC 18 may generate at least one signal consisting of a power signal and/or a data signal to pre-power or prime the expendable in the magazine and to simultaneously provide any mission data file instructions to the expendable, particularly in instances wherein the expendable is a smart expendable. Such mission data file information may include, for example, information such as the type, current position, heading, velocity, spin rate, or the like of the detected enemy threat, which may further generate a varied response depending upon the specifics of each data parameter and threat characteristic. For example, where the incoming threat is a guided or controlled projectile, a first response of a smart countermeasure expendable may be prompted, whereas an unguided or similar threat may generate a second, different countermeasure response. Such responses may include, but are not limited to, flare patterns, combination expendables (such as flares and chaff in combination), decoy direction and/or type (e.g. infrared decoys, radio frequency decoys, etc.), and the like.

Once the signal is generated, the sequencer 34 (which is part of the CMC 18) outputs such power and data signal to the CCA by the wiring harness 20. In one instance, the PCM 36 outputs a power signal to the first interface 70 to activate the first interface 70. In this instance, the power signal is sent along the first ID line 38 and the second ID line 40 to the first and second multiplexers 42, 44. Such activation of the first and second multiplexers 42, 44 cuts and/or deactivates the pathways to magazine identification switch 52, 54 to allow such power signal to be output and flow downstream. The power signal is also outputted to the filter 56 for at least suppressing unwanted noise and surges from upstream devices as well as to decrease and/or prevent electromagnetic interference. Such power signal is then outputted from the filter 56 to the first and second load switch buses 48, 50 for powering said first and second load switch buses 48, 50. When initiated, such power signal may also be sent to a payload of the first group of payloads 58 and/or a payload of the second group of payloads 60 for pre-powering components and devices equipped with the selected payloads.

Concurrently, the sequencer 34 also outputs another signal that includes power and data to the second interface 72 along the DDL 39. Initially, the data signal is received by the MCU 45 upon being outputted by the sequencer 34. At this stage, the MCU 45 outputs said data signal to one or both of the CSSCI transceivers 46 based on the signal received from the sequencer 36. In this example, the MCU 45 outputs the data signal to the first CSCCI transceiver 46 that is connected with the first load switch bus 48 since, in this example, the sequencer 34 requests that one of the payloads 58 be ejected and dispensed. The data signal is received by the first CSSCI transceiver 46 is then outputted along the first keyed data path 49 to the first load switch bus 48 due to the MCU 45 outputting said data signal to the first CSSCI transceiver 46. As such, the first keyed data path 49 is set to an active or ON state thus allowing the data signal to be outputted to the first load switch bus 48. It should be noted that the power outputted from the first interface 70 and the data signal outputted from the second interface 72 pass into the first load switch bus 48, in this example, to deliver power and control data to the selected payload of the first group of payloads 58 prior to be ejected and dispensed. Such output of the power and the data are coupled together based on the configuration of the CSSCI transceivers 46 mentioned herein.

Once the power and data signal reaches the first load switch bus 48, one of the load switches included in the first load switch bus 48 is selected and activated while the remaining load switches are deactivated. In this particular embodiment, one of three load switches included in the first load switch bus 48 is selected and is activated while the remaining load switches are deactivated. Upon such activation, the power and data signal travels through the first load switch bus 48 at the selected load switch so that the power and data signal may travel down the respective fire line path 62 that is associated with the selected load switch. At this point, the squib of the selected payload 58 may be pre-powered by the power that is coupled to the power and data signal. Additionally, flight parameters that were loaded into the on-board smart communication devices of the selected payload 58 may be changed or altered based on the data or information coupled with the power and data signal.

Upon transmitting power and any relevant data communications across the CSSCI interface the voltage may be fed into a bus, such as first or second bus 48 and/or 50, common to one of the payload locations on each first and second ID line 38 and 40 utilizing magazine identification switches 52 and/or 54. The power and data may be multiplexed by the EFSM CCA 32 onto the existing fire line paths 62 and/or 64, from the transceiver 46 to the fire pins in the breach plate, which may then prompt the fire pulses to fire the squibs thus igniting the squibs and ultimately launching the one or more countermeasure expendables 14 to address the incoming and detected enemy threat.

In other exemplary embodiments, the MCU 45 may output such power and data signal to other downstream components based on the data signal and/or instructions provided by sequencer 34. In one exemplary instance, to the second CSCCI transceiver 46 that is connected with the second load switch bus 50 since the sequencer 34 requests that one of the payloads 60 be ejected and dispensed. In another exemplary instance, the MCU 45 may output such power and data signal to the first and second CSCCI transceivers 46 since the sequencer 34 requests that one of the payloads 58 be ejected and dispensed and one of the payloads 60 be ejected and dispensed.

The system of the present disclosure may additionally include one or more sensors to sense or gather data pertaining to the surrounding environment or operation of the system. Some exemplary sensors capable of being electronically coupled with the system of the present disclosure (either directly connected to the system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The system of the present disclosure may include wireless communication logic coupled to sensors on the system. The sensors gather data and provide the data to the wireless communication logic. Then, the wireless communication logic may transmit the data gathered from the sensors to a remote device. Thus, the wireless communication logic may be part of a broader communication system, in which one or several systems of the present disclosure may be networked together to report alerts and, more generally, to be accessed and controlled remotely. Depending on the types of transceivers installed in the system of the present disclosure, the system may use a variety of protocols (e.g., Wifi, ZigBee, MiWi, Bluetooth) for communication. In one example, each of the systems of the present disclosure may have its own IP address and may communicate directly with a router or gateway. This would typically be the case if the communication protocol is WiFi.

In another example, a point-to-point communication protocol like MiWi or ZigBee is used. One or more of the system of the present disclosure may serve as a repeater, or the system of the present disclosure may be connected together in a mesh network to relay signals from one system to the next. However, the individual system in this scheme typically would not have IP addresses of their own. Instead, one or more of the system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the system of the present disclosure may differ from embodiment to embodiment. In one embodiment, alerts and signals from the system of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular system of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the system of the present disclosure may also be sent to a work tracking system that allows the individual, or the organization for which he or she works, to track the status of the various alerts that are received, to schedule particular workers to repair a particular system of the present disclosure, and to track the status of those repair jobs. A work tracking system would typically be a server, such as a Web server, which provides an interface individuals and/organizations can use, typically through the communication network. In addition to its work tracking functions, the work tracker may allow broader data logging and analysis functions. For example, operational data may be calculated from the data collected by the sensors on the system of the present disclosure, and the system may be able to provide aggregate machine operational data for a system of the present disclosure or group of systems of the present disclosure.

The system also allows individuals to access the system of the present disclosure for configuration and diagnostic purposes. In that case, the individual processors or microcontrollers of the system of the present disclosure may be configured to act as Web servers that use a protocol like hypertext transfer protocol (HTTP) to provide an online interface that can be used to configure the system. In some embodiments, the systems may be used to configure several systems of the present disclosure at once. For example, if several systems are of the same model and are in similar locations in the same location, it may not be necessary to configure the systems individually. Instead, an individual may provide configuration information, including baseline operational parameters, for several systems at once.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An enhanced fire select multiplexing (EFSM) assembly for a countermeasure dispenser system comprising:
- at least one sequencer;
- a 28V power control module;
- a first magazine identification line operable to connect the at least one sequencer and the 28V power control module to a first transceiver and a first 28V bus;
- a second magazine identification line operable to connect the at least one sequencer and the 28V power control module to a second transceiver and a second 28V bus;
- a first countermeasure expendable payload connected to the first transceiver and first 28V bus; and
- a second countermeasure expendable payload connected to the second transceiver and second 28V bus;
- wherein the EFSM assembly is configured to provide power and data transmission to at least one countermeasure expendable payload from one of the first and second countermeasure expendable payloads over a single fire pin pair; and
- wherein the first and second transceivers and 28V busses are operable to deliver 20 W of power to the first and second countermeasure expendable payloads.

2. The EFSM assembly of claim 1 further comprising:
- a circuit card assembly having the first magazine identification line and the second magazine identification line thereon; and
- a countermeasure controller containing the at least one sequencer and the 28V power control module therein.

3. The EFSM assembly of claim 2 wherein the first transceiver and first 28V bus are operable to deliver both power and data to the first countermeasure expendable payload.

4. The EFSM assembly of claim 3 wherein the second transceiver and second 28V bus are operable to deliver both power and data to the second countermeasure expendable payload.

5. The EFSM assembly of claim 1 wherein the first and second transceivers and 28V busses are operable to deliver data at a 500k baud rate to the first and second countermeasure expendable payloads.

6. The EFSM assembly of claim 1 wherein the countermeasure dispensing system further comprises:
- a vehicle carrying a countermeasure dispenser containing the at least one expendable payload therein.

7. The EFSM assembly of claim 6 wherein the at least one expendable payload further comprises:

at least one of flares, chaff, and steerable decoys.

8. The EFSM assembly of claim 6 wherein the vehicle further comprises:

an aircraft having an A-kit wiring harness therein.

9. The EFSM assembly of claim 8 further comprising:

a wiring harness operable to connect the at least one sequencer and the 28V power control module to the A-kit wiring harness of the aircraft.

* * * * *